(12) United States Patent
Takagi (10) Patent No.: US 10,964,464 B2
(45) Date of Patent: Mar. 30, 2021

(54) MAGNET AND MOTOR USING THE SAME

(71) Applicant: TDK Corporation, Tokyo (JP)

(72) Inventor: Nobuo Takagi, Tokyo (JP)

(73) Assignee: TDK CORPORATION, Tokyo (JP)

(*) Notice: Subject to any disclaimer, the term of this patent is extended or adjusted under 35 U.S.C. 154(b) by 124 days.

(21) Appl. No.: 16/194,521

(22) Filed: Nov. 19, 2018

(65) Prior Publication Data

US 2019/0164673 A1   May 30, 2019

(30) Foreign Application Priority Data

Nov. 24, 2017   (JP) .............................. JP2017-226118

(51) Int. Cl.
| | | |
|---|---|---|
| *H01K 1/02* | (2006.01) | |
| *H01F 1/057* | (2006.01) | |
| *H02K 1/02* | (2006.01) | |
| *H01F 41/02* | (2006.01) | |
| *H02K 1/27* | (2006.01) | |

(52) U.S. Cl.
CPC ......... *H01F 1/0577* (2013.01); *H01F 41/026* (2013.01); *H01F 41/0293* (2013.01); *H02K 1/02* (2013.01); *H02K 1/276* (2013.01)

(58) Field of Classification Search
CPC .. H01F 1/0577; H01F 41/026; H01F 41/0293; H02K 1/02; H02K 1/276
USPC ........................................................ 148/302
See application file for complete search history.

(56) References Cited

U.S. PATENT DOCUMENTS

| | | |
|---|---|---|
| 2008/0050581 A1 | 2/2008 | Miwa et al. |
| 2008/0202642 A1 | 8/2008 | Sakamoto et al. |
| 2012/0112862 A1 | 5/2012 | Miwa et al. |

FOREIGN PATENT DOCUMENTS

| | | |
|---|---|---|
| CN | 1938798 A | 3/2007 |
| JP | S60-063903 A | 4/1985 |
| JP | H11-004555 A | 1/1999 |
| JP | 2006-286779 A | 10/2006 |

*Primary Examiner* — Jie Yang (74) *Attorney, Agent, or Firm* — Faegre Drinker Biddle & Reath LLP (57) ABSTRACT

The present invention aims to provide a novel magnet, whose surface's insulating property can be increased, and a motor using the same. The present invention provides a magnet comprising a magnet element containing a rare earth element R, a transition metal element T and boron B, and a phosphate layer including manganese-containing phosphate, wherein the phosphate layer is provided on the surface of the magnet element, and the thickness of the phosphate layer is 0.5 μm or more.

3 Claims, 4 Drawing Sheets

*Fig.4B*

MAGNET AND MOTOR USING THE SAME

TECHNICAL FIELD

The present invention relates to a magnet and a motor using the same.

BACKGROUND

Rare earth magnets are being studied as magnets for motor. In recent years, large magnets have been in demand for the motor of large transportations or generators. Since rare earth magnets have a high conductivity, eddy currents occur inside the magnet when used in a motor. When eddy currents occur inside the magnet, heat (loss) occurs due to the electrical resistance, causing problems such as a decrease in motor efficiency and demagnetization. However, Japanese Unexamined Patent Publication No. 2006-286779 discloses that eddy currents decrease when a magnet is divided and an insulating layer is provided on the surface of each of the divided magnets, and the divided magnets are stacked and used. Resins and the like are used as materials for this insulating layer.

SUMMARY

However, applications of magnets for motor have expanded in recent years, and novel magnets imparted with insulating property on the surface by a different method are in demand. The present invention has been achieved, taking the above-mentioned context into consideration and aims to provide a novel magnet, whose surface's insulating property can be increased, and a motor using the same.

The present invention provides a magnet comprising a magnet element containing a rare earth element R, a transition metal element T and boron B, and a phosphate layer including manganese-containing phosphate, wherein the phosphate layer is provided on the surface of the magnet element, and the thickness of the phosphate layer is 0.5 μm or more. The magnet has excellent insulating property compared to magnets without a phosphate layer.

The surface of the magnet element can have a main phase having a plurality of $R_2T_{14}B$ crystal grains and a grain boundary phase arranged among the $R_2T_{14}B$ crystal grains, and in this case, it is preferable that the phosphate layer covers the main phase of the magnet element and does not cover the grain boundary phase of the magnet element. Moreover, the thickness of the phosphate layer can be 5.0 μm or less.

The present invention also provides a motor comprising a rotor having a core and two or more magnets, and a stator, wherein at least one of the magnets is the above magnet.

Furthermore, the present invention provides a motor, wherein the core has slits, and a plurality of the above magnets are arranged in each of the slits.

According to the present invention, it is possible to provide a novel magnet, whose surface's insulating property can be increased, and a motor using the same.

BRIEF DESCRIPTION OF THE DRAWINGS

FIGS. 2A and 2B show the motor according to one embodiment of the present invention.

FIGS. 4A and 4B are images obtained by photographing the magnet obtained in Example 5, FIG. 4A is an image of the magnet's section.

DETAILED DESCRIPTION

The preferred embodiments of the present invention are described below with reference to the drawings. However, the present invention is not limited to the following embodiments.

<Magnet>

Figure 1:
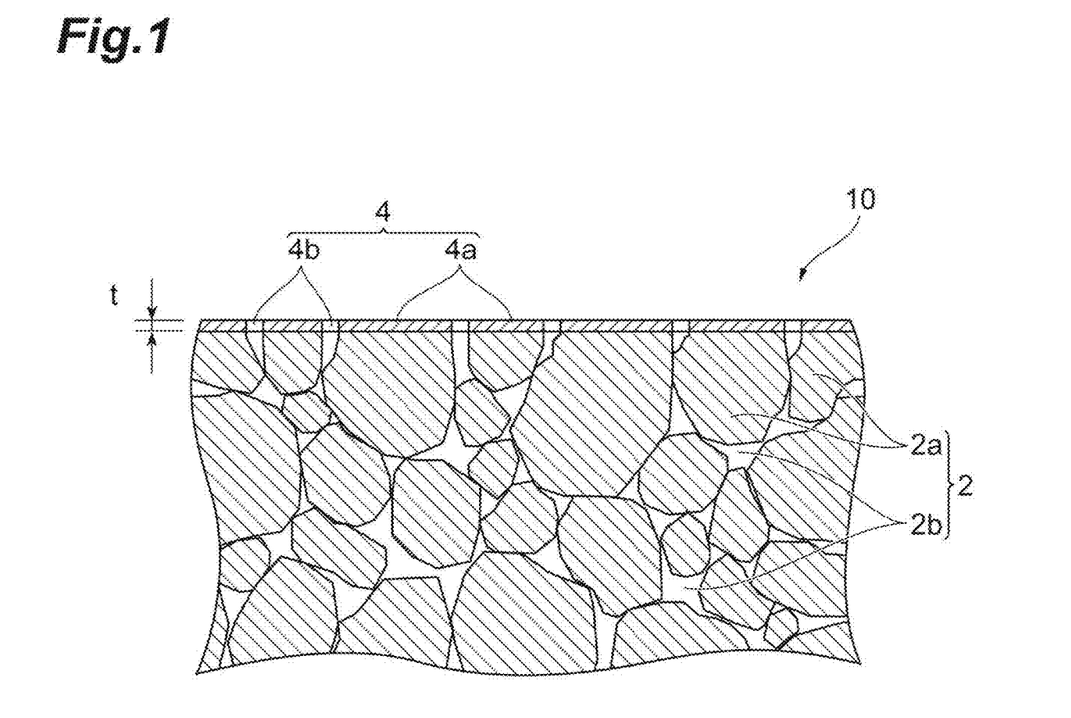
FIG. 1 is a schematic sectional view in the vicinity of the magnet's surface according to one embodiment of the present invention.

FIG. 1 is a schematic sectional view in the vicinity of the magnet's surface according to one embodiment of the present invention.

In FIG. 1, a magnet 10 comprises a magnet element 2 and a phosphate layer 4. The phosphate layer 4 covers the surface of the magnet element 2 and is provided on the surface of the magnet element 2. It is preferable that the phosphate layer 4 be provided in such a way as to be in contact with the outer surface of the magnet element 2.

(Magnet Element)

The magnet element 2 is a permanent magnet (R-T-B based permanent magnet) containing a rare earth element R, a transition metal element T and boron B. As the R-T-B based permanent magnet, an R-T-B based sintered magnet produced by sintering is preferably used. Moreover, instead of a sintered magnet, an R-T-B based permanent magnet produced by hot formation or hot working can also be used.

As shown in FIG. 1, the magnet element 2 has a main phase 2a having a plurality of $R_2T_{14}B$ crystal grains and a grain boundary phase 2b arranged among the main phases 2a, these two areas being exposed on the outer surface of the magnet element 2. The grain boundary phase 2b include a two-grain boundary arranged between two adjacent main phases 2a and multi-grain boundaries arranged among three or more adjacent main phases 2a.

The $R_2T_{14}B$ crystal grains have a crystal structure having $R_2T_{14}B$ type tetragonal crystals. The average grain diameter of the $R_2T_{14}B$ crystal grains is usually about 1 μm to 30 μm.

The occupancy ratio of the main phase 2a on the outer surface of the magnet element 2 is preferably 80 area % or more, or 90 area % or more.

R in the R-T-B based permanent magnet represents at least one of rare earth elements. The rare earth element refers to Sc, Y and lanthanoid elements from the group 3 in the long period type periodic table. Lanthanoid elements include, for example, La, Ce, Pr, Nd, Sm, Eu, Gd, Tb, Dy, Ho, Er, Tm, Yb and Lu. Rare earth elements are classified into light rare earth elements and heavy rare earth elements, with Gd, Tb, Dy, Ho, Er, Tm, Yb and Lu as heavy rare earth elements (hereinafter referred to as $R_H$), and all other rare earth elements being light rare earth elements (hereinafter referred to as $R_L$). In R-T-B based permanent magnets, from the point of view of production costs and magnetic properties, R preferably includes $R_L$ (rare earth elements including at least either Nd or Pr, or both). Moreover, from the point of view of improving the magnetic properties, it is more preferable that both $R_L$ (rare earth elements including at least either Nd or Pr, or both) and $R_H$ (rare earth elements including at least either Dy or Tb, or both) be included.

In the R-T-B based permanent magnet, T represents one or more transition metal elements, and T surely contain Fe, or Fe and Co. T can be Fe alone, or part of Fe can be replaced by Co. When replacing part of Fe by Co, the temperature characteristics can be improved without reducing the magnetic properties.

Examples of the transition metal elements other than Fe and Co include Ti, V, Cu, Cr, Mn, Ni, Zr, Nb, Mo, Hf, Ta and W. Moreover, T can also include at least one element such as Al, Ga, Si, Bi and Sn, in addition to the transition metal elements.

In the R-T-B based permanent magnet, part of B can be replaced by carbon (C). In this case, the production of the magnet becomes easier, and the production costs can also be reduced. Moreover, the amount of C to be replaced is set to be that not substantially affecting the magnetic properties. In addition, O, C, Ca and the like can also be inevitably mixed.

The content of R in the R-T-B based permanent magnet is 25 mass % or more and 35 mass % or less, preferably 28 mass % or more and 33 mass % or less. Moreover, the content of B in the R-T-B based permanent magnet is, for example, 0.5 mass % or more and 1.5 mass % or less, and the content of Fe is substantially the balance of the constituting elements of the R-T-B based permanent magnet. The content of Co, when part of Fe is replaced by Co, is, for example, 0.3 mass % or more and 4.0 mass % or less.

The size of the magnet element 2 can be, but is not particularly limited to, for example, 50 mm×10 mm×10 mm.

(Phosphate Layer)

The phosphate layer 4 includes phosphate containing manganese (manganese-containing phosphate). An example of phosphate containing manganese is manganese phosphate. Examples of manganese phosphate are $Mn_5(PO_3(OH))_2(PO_4)_2 \cdot 4H_2O$, $Mn_5H_2(PO_4)_4 \cdot 4H_2O$ and $MnHPO_4 \cdot H_2O$.

The phosphate layer 4 can include 50 mass % or more, 70 mass % or more, 90 mass % or more, or 95 mass % or more of phosphate containing manganese.

The phosphate layer 4 can include phosphate containing metals other than manganese and can also include compounds other than phosphate. Examples of the metals other than manganese include iron, nickel, potassium and calcium.

In the present embodiment, the thickness t of the phosphate layer 4 is 0.5 μm or more. By providing the magnet 10 with a phosphate layer 4 of a thickness of 0.5 μm or more, the insulating property of the magnet's surface can be improved. The thickness t of the phosphate layer 4 can be adjusted by the number of chemical conversion treatments, the concentration of the chemical conversion treatment solution and the like. From the point of view of obtaining a higher insulating property, the thickness t of the phosphate layer 4 is preferably 0.7 μm or more, and more preferably 1.0 μm or more. There is no particular upper limit to the thickness t of the phosphate layer 4, but due to cost constraints, it can be, for example, 5.0 μm, or even 3.0 μm. If the thickness of the phosphate layer 4 varies with places, 20 SEM images of the phosphate layer 4 part of the longitudinal section of the magnet 10 are arbitrarily taken, the average of the measured values of the thickness of 5 or more arbitrary areas in each image is further averaged by the 20 images, and the obtained value is considered as the thickness t.

As shown in FIG. 1, the phosphate layer 4 can have covering parts 4a and non-covering parts 4b. A plurality of covering parts 4a are separated from each other by the non-covering parts 4b.

In FIG. 1, the covering parts 4a cover the main phases 2a on the surface of the magnet element 2, the non-covering parts 4b are arranged on the parts where the grain boundary phases 2b on the surface of the magnet element 2 are exposed. That is, in FIG. 1, the covering parts 4a are not covering the grain boundary phases 2b of the magnet element.

If the phosphate layer 4 has covering parts 4a and non-covering parts 4b, the occupancy ratio of the covering parts 4a with respect to unit surface area of the magnet element 2 is preferably 80 area % or more, more preferably 90 area % or more, as is the occupancy ratio of the main phase on the outer surface of the above magnet element. This allows to obtain more easily stable insulating property of the magnet.

(Production Method)

The production method of such a magnet will be then described.

First, a raw material powder of the R-T-B based permanent magnet is obtained by the known usage such as the strip casting method. Next, the raw material powder is pulverized by hydrogen absorption pulverization, jet mill, or the like. The obtained powder is then filled in the press mold and formed by pressing, while applying a magnetic field as needed. Then, the obtained green compact should be quenched after sintering under a non-oxidative atmosphere such as in vacuum. Then, an aging treatment can be performed as needed.

Next, the surface of the obtained magnet element 2 is washed with an acid as needed. An example of the acid is a 0.5 to 10 mass % aqueous nitric acid solution. This allows to etch the surface of the magnet element 2 and to remove the oxide film and the like.

Next, the magnet element 2 is washed with water, the water is replaced by an organic solvent such as IPA, and the organic solvent is dried by a drying furnace or the like. Next, the treatment solution for the formation of the phosphate layer is brought into contact with the obtained magnet element. Such a treatment is also called "chemical conversion treatment". An example of a treatment solution for the formation of the phosphate layer is an aqueous chemical conversion treatment solution including phosphoric acid, manganese phosphate, manganese nitrate and nickel nitrate. The temperature of the treatment solution at the time of contact can be 10 to 40° C.

The concentration of the phosphoric acid in the treatment solution can be 1 to 10 mass %, that of the manganese phosphate 1 to 10 mass %, that of manganese nitrate 1 to 10 mass % and that of the nickel nitrate 0.1 to 10 mass %.

It is difficult to obtain a phosphate layer of a thickness of 0.5 μm or more by chemical conversion treatment under normal conditions using a flotilla' treatment solution. If the thickness of the phosphate layer formed by one contact treatment does not reach 0.5 μm, a phosphate layer of the desired thickness can be formed by repeating the contact with the treatment solution, the washing of the surface with water and the drying. Regarding the drying, the water can be replaced by an organic solvent such as IPA. It is possible to make the phosphate layer thicker by performing the contact treatment for a long time without washing with water, but the concentration of the treatment solution may vary, or the components or the composition of the treatment solution may vary by reacting with other compounds. When a phosphate layer including unintended compounds is formed due to changes in the treatment solution, the formation of a new layer on such compounds may be uneven, and as a result, the desired thickness may not be obtained. The residue produced by one contact treatment can be removed by repeating the contact with the treatment solution, the water washing and the drying. This allows to inhibit the components or the concentration of the treatment solution to change and unintended compounds to be formed due to the residue, and an even phosphate layer having a desired thickness tends to be obtained more stably.

When performing the above chemical conversion treatment on the magnet element 2 of the R-T-B based permanent magnet, where the main phase 2a and the grain boundary phase 2b are exposed to the surface, the phosphate layer 4 (covering part 4a) is deposited on the surface of the main phase 2a of the R-T-B based permanent magnet, and the phosphate layer 4 (covering part 4a) is not deposited substantially on the surface of the grain boundary phase 2b of the R-T-B based permanent magnet. The reason why the phosphate layer 4 (covering part 4a) is deposited selectively on the surface of the main phase 2a is not necessarily clear, but it is probably due to the fact that the manganese phosphate in the treatment solution easily reacts with Fe present in the main phase.

(Mechanism)

According to the magnet 10 relating to the present embodiment, having a phosphate layer 4 of a thickness of 0.5 μm or more on the surface of the magnet element 2 imparts insulating property to the surface.

Moreover, the reaction rate of the chemical conversion treatment can be improved and the phosphate layer of the desired thickness is more easily obtained in a short time by providing the phosphate layer 4 in such a way as to be in contact with the surface of the magnet element 2. Moreover, the volume ratio of the magnet element acting as a magnet in a magnet of a fixed volume increases and superior magnetic properties are more easily obtained by providing the phosphate layer 4 in such a way as to be in contact with the surface of the magnet element 2. Furthermore, if another layer is provided between the magnet element 2 and the phosphate layer 4, the following problems may occur due to each layer having a different coefficient of thermal expansion. For example, when utilizing the magnet in an automobile and the like used in harsh environments, cracks or delamination is more likely to occur due to the great temperature variations (−40 to 200° C.). However, it is possible to suppress the occurrence of such cracks or delamination by providing the phosphate layer 4 in such a way as to be in contact with the surface of the magnet element 2.

<Motor>

Figure 2A:
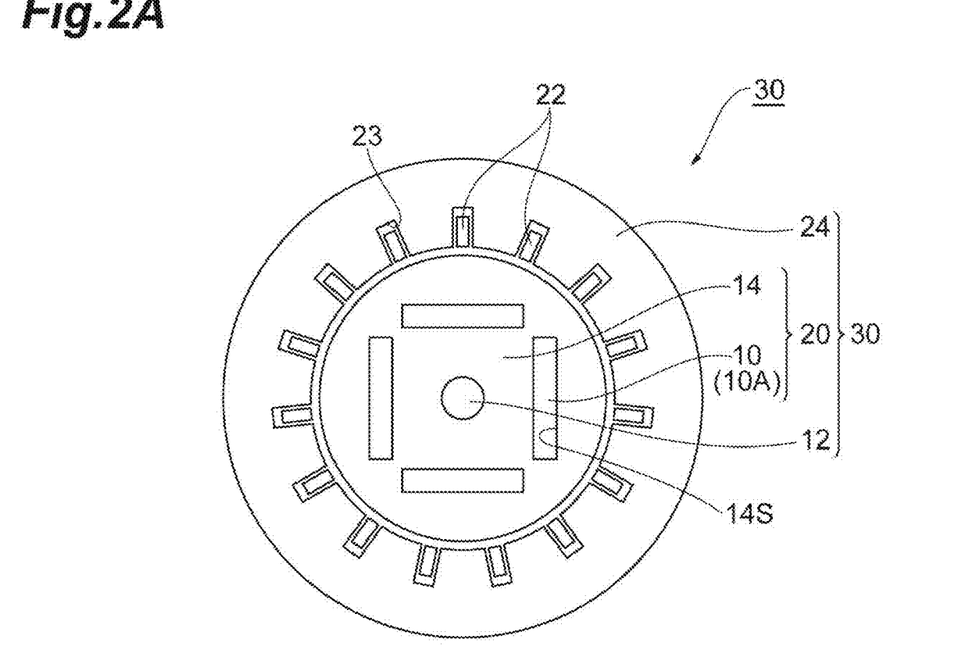
FIG. 2A is a sectional view of the motor.
Figure 2B:
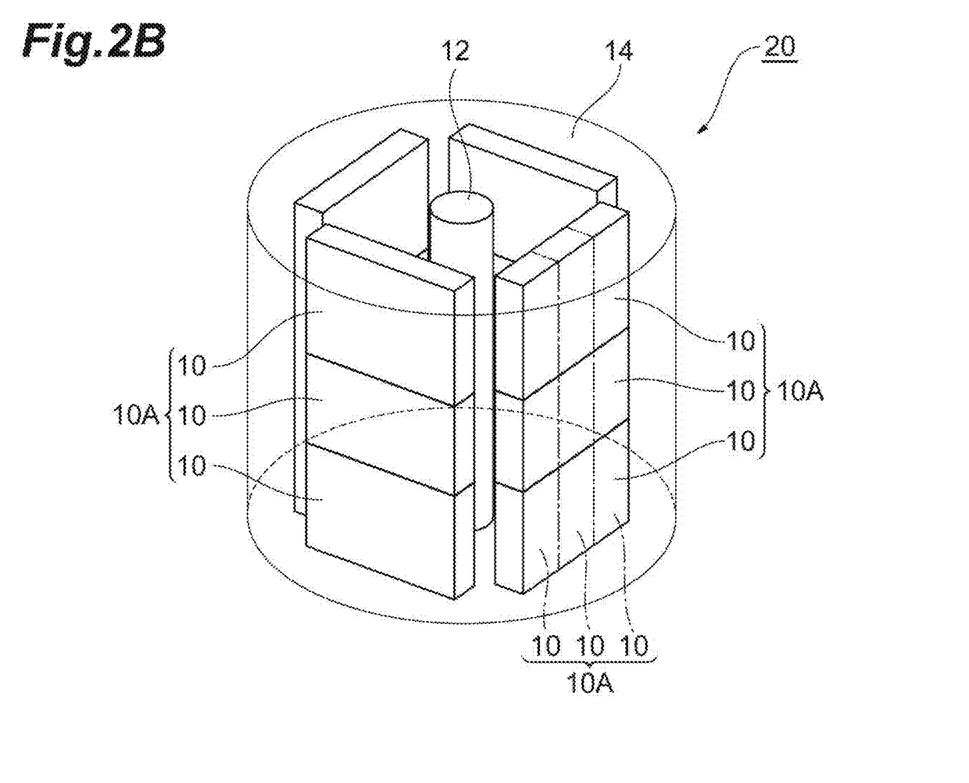
FIG. 2B is a perspective view of the rotor in the motor.

FIGS. 2a and 2b show the motor according to one embodiment of the present invention, FIG. 2A is a sectional view of the motor, and FIG. 2B is a perspective view of the rotor in the motor.

In FIG. 2A, the motor 30 comprises a rotating shaft 12, a rotor 20 rotatably provided with the rotating shaft 12, and a stator 24 surrounding the rotor 20. The annular stator 24 has a plurality of slots 23 provided inside at predetermined intervals, and an armature coil 22 is fitted in each slot 23. In FIGS. 2A and 2B, the rotor 20 has a cylindrical core (iron core) 14 and four slits 14S that are formed in such a way as to be separated from each other in the circumferential direction in the core 14 and extend in the axial direction of the rotating shaft 12. In each slit 14S, a plurality of the above magnets 10 (three in FIG. 2B) are arranged. Herein, the plurality of magnets 10 in one slit 14S is collectively called magnet assembly 10A. In FIG. 2A, four magnet assemblies 10A are arranged in such a way that the magnet assemblies 10A wherein the rotating shaft 12 side is the north pole and the opposite side is the south pole and the magnet assemblies 10A wherein the rotating shaft 12 side is the south pole and the opposite side is the north pole are arranged circumferentially and alternately, allowing adjacent magnet assemblies 10A along the circumferential direction of the core 14 to mutually generate magnetic lines of force of opposite direction along the radial direction of the core 14. Usually, the magnetization directions of each magnet 10 inside the magnet assembly 10A are the same.

The three magnets 10 are mutually in direct contact and are fixed inside the slits 14S of the core 14. The eddy current loss in the motor can be suppressed, given that the surface of the magnet 10 has electrically insulating property by the phosphate layer 4. In the motor according to the present embodiment, it is not necessary to arrange an insulator having electrically insulating property between the magnets 10. Therefore, the following effects tend to be obtained: (I) the production costs can be reduced, (II) the ratio of volume capable of expressing a magnetic function in a magnet of a fixed volume further increases and superior magnetic properties can be more easily obtained, and (III) the occurrence of cracks or delamination due to harsh temperature variations (−40 to 200° C.) when used in automobiles can be further suppressed. Moreover, if the phosphate layer 4 has covering parts 4a and non-covering parts 4b, the contact area between the magnets 10 becomes smaller, allowing to further increase the electrically insulating property between the magnets 10.

In FIG. 2A, we described as aspect where four slits 14S and magnet assemblies 10A are arranged in a circumferential direction in the rotor 20, but it is sufficient that two or more slits 14S and magnet assemblies 10A are arranged in a circumferential direction. Moreover, in FIG. 2B, three magnets 10 are arranged in the axial direction of the rotating shaft 12 in the magnet assembly 10A of the rotor 20, but two, or four or more magnets may be arranged. Moreover, in the above embodiment, three magnets 10 are arranged side by side in the axial direction of the rotating shaft 12 inside the slits 14S, but as shown by a dashed-dotted line in FIG. 2B, three magnets 10 may be arranged side by side in the circumferential direction of the core 14. Furthermore, inside the slits 14S, three magnets 10 may be arranged side by side in the axial direction of the rotating shaft 12, and three magnets 10 may be arranged side by side in the circumferential direction of the core 14. In this case, nine magnets 10 in total are arranged inside the slit 14S and constitute the magnet assembly 10A. Instead of a magnet assembly 10A, it is also possible to use a magnet 10 alone inside the slits 14S. Moreover, the motor 30 is not limited to the aspect described in the above embodiment, and it is sufficient that the rotor 20 has two or more magnets and at least one magnet of these is the above magnet 10.

An example has been described above where the magnets 10 inside the slits 14S are in direct contact to each other, but they may also be fixed to each other via a bonding layer. If the magnets 10 are fixed to each other via a bonding layer, and the phosphate layer 4 has covering parts 4a and non-covering parts 4b, the adhesiveness between the magnet 10 and the bonding layer is improved by anchor effect, and the adhesiveness between the magnets 10 tends to improve.

We have described a magnet embedded motor (IPM motor) above, but the motor may also be a magnet affixed motor (SPM motor) wherein the magnets 10 are not provided inside the slits 14S of the core 14, but on the outer peripheral surface of the core 14.

As described above, the magnet according to the present embodiment can be used preferably as a permanent magnet to be used in the rotor of a magnet type motor (PM motor). The magnet according to the present embodiment allows to decrease eddy current loss when a plurality of magnets are stacked and used in the motor, given that its surface has insulating property.

EXAMPLES

Hereinafter, the present invention will be described in more detail by Examples, but is not to be limited thereto.

<Production of R-T-B Based Permanent Magnet>

First, in order to obtain the R-T-B based permanent magnet with a magnet composition shown in Table 1, a magnet composition was prepared by the strip casting method. In Table 1, bal. refers to the balance when the total magnet composition is set at 100 mass %, and (T.RE) refers to the total mass % of the rare earth elements.

TABLE 1

|  | Nd | Pr | (T.RE) | Co | Al | Cu | Zr | B | Fe |
|---|---|---|---|---|---|---|---|---|---|
| Magnet composition | 24.8 | 5.9 | 30.7 | 1.0 | 0.20 | 0.15 | 0.20 | 1.0 | bal. |

Next, a hydrogen pulverization treatment (coarse pulverization) was carried out under Ar atmosphere, at 600° C., for 1 hour, after hydrogen was absorbed in the magnet composition at room temperature.

In this Example, each process (fine pulverization and molding) from this hydrogen pulverization treatment to the sintering was carried out under Ar atmosphere having an oxygen concentration of less than 50 ppm (the same applies in the following Examples and Comparative Examples).

Next, before performing the fine pulverization after the hydrogen pulverization, 0.1 mass % of zinc stearate was added as a pulverizing agent to the coarsely pulverized powder, and mixed with a Nauta mixer. After, fine pulverization is carried out with a jet mill to form finely pulverized powder of an average particle diameter of about 4.0 μm.

The obtained finely pulverized powder is filled in a press mold arranged on an electromagnet, molding was performed in a magnetic field applying a pressure of 120 MPa while applying a magnetic field of 1200 kA/m, and the green compact was obtained.

By heating the obtained green compact by maintaining it at 1060° C. in vacuum for 4 hours, followed by quenching, a rare earth magnet having the magnet composition shown in Table 1 was obtained. Then, a two-stage aging treatment was applied on the obtained rare earth magnet, at 850° C. for 1 hour and at 540° C. for 2 hours (both under Ar atmosphere).

The prepared magnet was immersed in a 1% aqueous nitric acid solution for 90 seconds and the magnet after immersion was washed with water. After further washing the magnet with isopropyl alcohol (IPA) (IPA substitution), the IPA was volatilized by leaving it for 5 minutes in a furnace at 80° C., and the magnet element of the R-T-B based permanent magnet was prepared.

Figure 3:
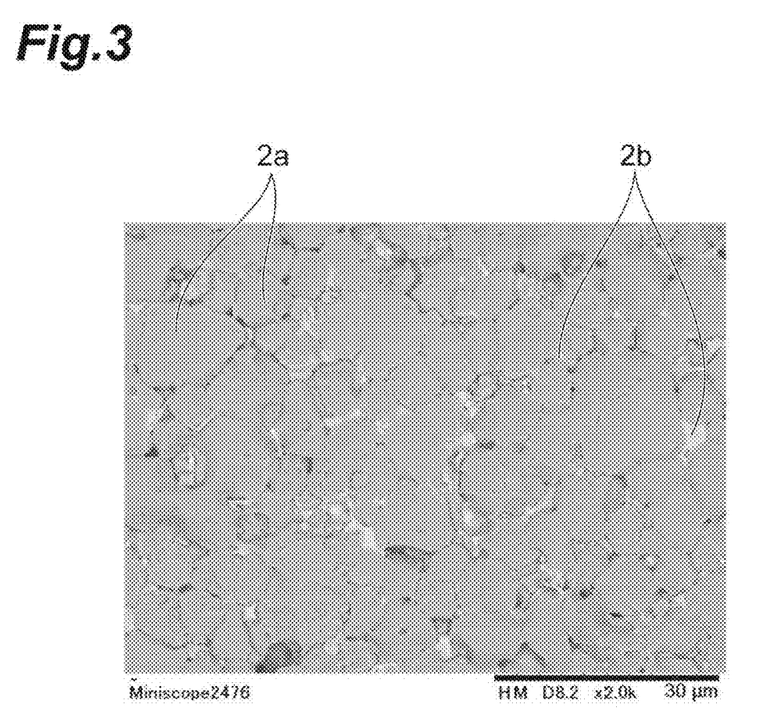
FIG. 3 is an image obtained by photographing the surface of an R-T-B based permanent magnet (magnet element) according to Examples.

FIG. 3 is an image obtained by photographing the surface of the magnet element of the R-T-B based permanent magnet obtained. The main phase 2a and the grain boundary phase 2b were observed.

<Preparation of Magnet>

Example 1

The chemical conversion treatment solution A was prepared in the treatment container. The components of the chemical conversion treatment solution A are shown in Table 2 below. The treatment container containing the chemical conversion treatment solution A was placed in the bath of an oil bath set to 80° C. and the R-T-B type permanent magnet was immersed in the chemical conversion treatment solution A. The magnet after immersion was washed with water and dried by leaving it for 20 minutes in a furnace at 150° C. The immersion, the water washing and the drying may hereinafter also be referred to as the chemical conversion treatment process.

The process of immersing in the chemical conversion treatment solution A, water washing and drying was further repeated twice on the magnet. The phosphate layer was formed and the magnet of Example 1 was prepared by performing the chemical conversion treatment process for a total of three times. The obtained magnet was cut in a direction perpendicular to the chemical conversion treated surface, when the cut surface was observed by a scanning electron microscope (SEM), the formation of the phosphate layer on the magnet was confirmed, and when the thickness of the phosphate layer was measured, it was 0.63 μm.

Moreover, when performing an element analysis on the phosphate layer by an energy dispersive X-ray spectrometry (SEM-EDS), the presence of phosphorus, oxygen, potassium, calcium, iron and manganese was confirmed, confirming the formation of a film comprising phosphate containing manganese as a main component.

Moreover, the phosphate layer had covering parts and non-covering parts.

TABLE 2

| Component | Content [mass %] |
|---|---|
| Manganese phosphate | 1-10 |
| Phosphoric acid | 1-10 |
| Manganese nitrate | 1-10 |
| Nickel nitrate | 0.1-10 |
| Water | balance |

Examples 2 to 5

Figure 4A:
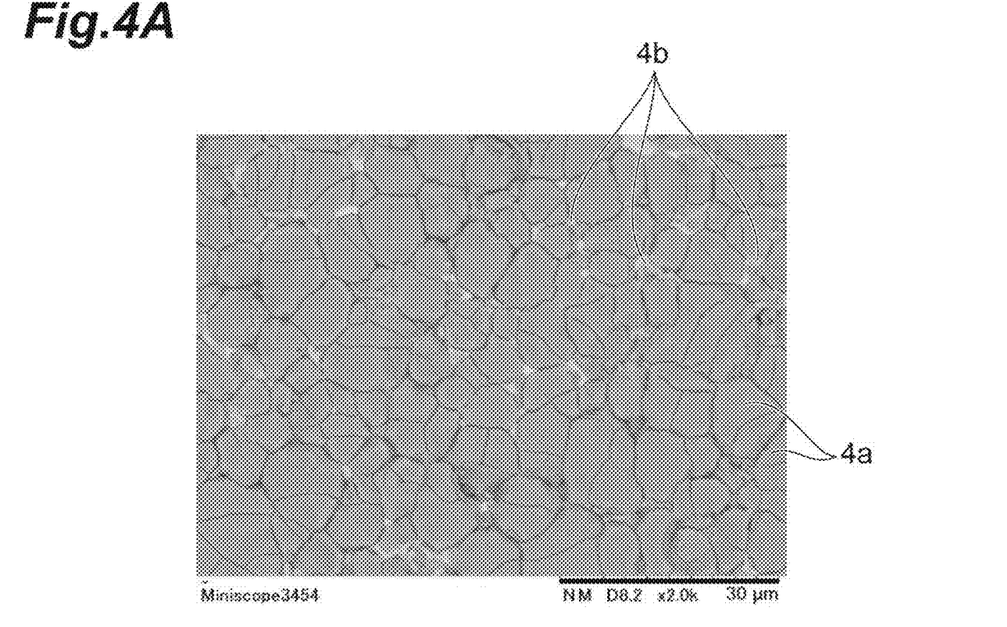
FIG. 4A is an image of the magnet's surface.
Figure 4B:
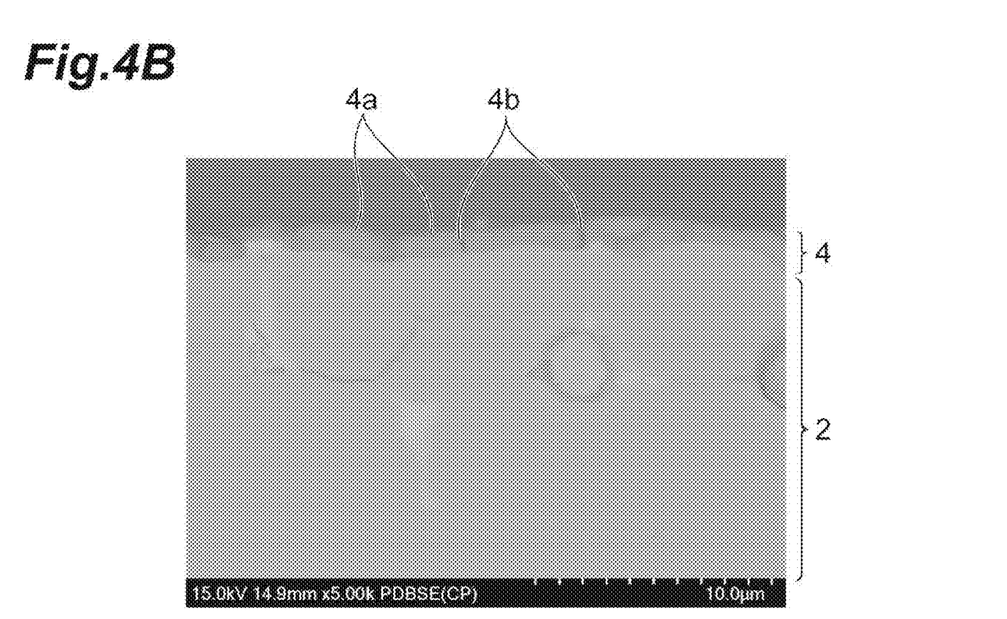

Except that the number of times of the processes of immersing in the chemical conversion treatment solution A, water washing and drying (chemical conversion treatment process) was changed into 4, 5, 6 and 7, respectively, in total, the magnets in Examples 2 to 5 were prepared in the same way as in Example 1. When measuring the thicknesses of the magnet's coating films in Examples 2 to 5, they were 0.75 μm, 1.1 μm, 1.2 μm and 1.3 μm, respectively. Moreover, the presence of phosphorus, oxygen, potassium, calcium, iron and manganese was confirmed in all the magnet's coating films of Examples 2 to 5, and the formation of a film comprising phosphate containing manganese as a main component was confirmed. Moreover, FIG. 4A is an image of the surface of the magnet prepared in Example 5 and FIG. 4B is the sectional image of the vicinity of the magnet's surface.

Comparative Example 1

The main body itself of the R-T-B based permanent magnet obtained above, without performing the chemical conversion treatment process (without a phosphate layer), was used as the magnet of Comparative Example 1.

Comparative Example 2

Except that the processes of immersing in the chemical conversion treatment solution A, water washing and drying (chemical conversion treatment process) were performed only once, the magnet of Comparative Example 2 was prepared in the same way as in Example 1. When measuring the thickness of the magnet's coating film of Comparative Example 2, it was 0.18 μm. Moreover, the presence of phosphorus, oxygen, iron and manganese was confirmed in the magnet's coating film of Comparative Example 2, and the formation of a film comprising phosphate containing manganese as a main component was confirmed.

Comparative Example 3

Except that the number of times of the processes of immersing in the chemical conversion treatment solution A, water washing and drying (chemical conversion treatment process) was changed into two in total, the magnet of Comparative Example 3 was prepared in the same way as in Example 1. When measuring the thickness of the magnet's coating film of Comparative Example 3, it was 0.31 μm. Moreover, the presence of phosphorus, oxygen, iron and manganese was confirmed in the magnet's coating film of Comparative Example 3, and the formation of a film comprising phosphate containing manganese as a main component was confirmed.

Comparative Example 4

The chemical conversion treatment solution B was prepared in the treatment container. The components of the chemical conversion treatment solution B are shown in Table 3 below. The treatment container containing the chemical conversion treatment solution B was placed in the bath of an oil bath set to 60° C. and the R-T-B type permanent magnet was immersed in the chemical conversion treatment solution B. The magnet after immersion was washed with water and dried by leaving it for 20 minutes in a furnace at 150° C.

When measuring the thickness of the magnet's coating film in Comparative Example 4, it was 0.05 μm. Moreover, the presence of phosphorus, oxygen, iron and zinc was confirmed in the magnet's coating film of Comparative Example 4, and the formation of a film comprising phosphate containing zinc as a main component was confirmed.

TABLE 3

| Component | Content [mass %] |
|---|---|
| Manganese phosphate | 10-20 |
| Phosphoric acid | 1-10 |
| zinc compound | 1-10 |
| Water | balance |

Comparative Example 5

Except that the number of times of the processes of immersing in the chemical conversion treatment solution B, water washing and drying (chemical conversion treatment process) was changed into two in total, the magnet of Comparative Example 5 was prepared in the same way as in Comparative Example 4. When measuring the thickness of the magnet's coating film of Comparative Example 5, it was 0.10 μm. Moreover, the presence of phosphorus, oxygen, iron and zinc was confirmed in the magnet's coating film of Comparative Example 5, and the formation of a film comprising phosphate containing zinc as a main component was confirmed.

Comparative Example 6

Except that the number of times of the processes of immersing in the chemical conversion treatment solution B, water washing and drying (chemical conversion treatment process) was changed into three in total, the magnet of Comparative Example 6 was prepared in the same way as in Comparative Example 4. When measuring the thickness of the magnet's coating film of Comparative Example 6, it was 0.15 μm. Moreover, the presence of phosphorus, oxygen, iron and zinc was confirmed in the magnet's coating film of Comparative Example 6, and the formation of a film comprising phosphate containing zinc as a main component was confirmed.

<Evaluation of Magnet>

Two magnets of each Example and Comparative Example (8.00 mm long×7.95 mm wide×4.65 mm thick) were stacked with their surface defined by length and width (primary surface) opposed to each other. The terminals of a resistance meter were contacted with the two surfaces of both external sides of the stacking direction of the stacked sample, and the resistance value between the terminals was measured.

The results of measurement of resistance values for the magnets of each Example and Comparative Example are shown in Table 4, along with the number of times of chemical conversion treatment processes, main component in the coating film, covering part occupancy ratio, and thickness of the coating film.

TABLE 4

| | Number of chemical conversion treatments | Coating film | | Resistance value [Ω] |
|---|---|---|---|---|
| | | Main component | Film thickness [μm] | |
| Comparative Example 1 | 0 | — | — | 0 |
| Comparative Example 2 | 1 | Phosphate containing Mn | 0.18 | 0.2 |
| Comparative Example 3 | 2 | Phosphate containing Mn | 0.31 | 0.3 |
| Example 1 | 3 | Phosphate containing Mn | 0.63 | 0.7 |
| Example 2 | 4 | Phosphate containing Mn | 0.75 | 0.9 |
| Example 3 | 5 | Phosphate containing Mn | 1.1 | 1.5 |
| Example 4 | 6 | Phosphate containing Mn | 1.2 | 1.4 |
| Example 5 | 7 | Phosphate containing Mn | 1.3 | 1.5 |
| Comparative Example 4 | 1 | Phosphate containing Zn | 0.05 | 0 |
| Comparative Example 5 | 2 | Phosphate containing Zn | 0.1 | 0 |
| Comparative Example 6 | 3 | Phosphate containing Zn | 0.15 | 0 |

For the magnets obtained in Examples 1 to 5, a uniform coating film with no irregularities was formed and a resistance value higher than those in Comparative Examples 1 to 6 was obtained. FIGS. 4A and 4B are images obtained by photographing the magnet obtained in Example 5, FIG. 4A is the image of the magnet's surface, and FIG. 4B is the image of the section of the magnet.

What is claimed is:
1. A magnet comprising:
  a magnet element containing a rare earth element R, a transition metal element T and boron B; and
  a phosphate layer including manganese-containing phosphate;

wherein the phosphate layer is provided on a surface of the magnet element, and a thickness of the phosphate layer is 0.5 μm or more and 5.0 μm or less,
wherein the surface of the magnet element has a main phase comprising a plurality of $R_2T_{14}B$ crystal grains and a grain boundary phase arranged among the $R_2T_{14}B$ crystal grains, and
the phosphate layer covers the main phase of the magnet element and does not cover the grain boundary phase of the magnet element.

2. A motor comprising:
a rotor having a core and two or more magnets; and
a stator;
wherein at least one of the magnets is the magnet according to claim 1.

3. A motor comprising:
a rotor having a core and two or more magnets; and
a stator;
wherein at least one of the magnets is the magnet according to claim 1,
the core has slits, and
a plurality of the magnets according to claim 1 are arranged in each of the slits.

* * * * *